United States Patent [19]

Sonnenberg et al.

[11] Patent Number: 5,030,663

[45] Date of Patent: * Jul. 9, 1991

[54] PROCESS FOR THE PREPARATION OF FIRE-RETARDANT EXPANDABLE THERMOPLASTIC BEADS

[75] Inventors: Fred M. Sonnenberg, Merion; Dennis M. Hajnik, West Chester, both of Pa.

[73] Assignee: Arco Chemical Technology, Inc., Wilmington, Del.

[*] Notice: The portion of the term of this patent subsequent to Dec. 25, 2007 has been disclaimed.

[21] Appl. No.: 517,284

[22] Filed: May 1, 1990

Related U.S. Application Data

[63] Continuation of Ser. No. 456,400, Dec. 26, 1989, abandoned.

[51] Int. Cl.$^5$ ................................................ C08J 9/18
[52] U.S. Cl. ........................................ 521/60; 521/88; 521/907
[58] Field of Search ................... 521/60, 56, 57, 907

[56] References Cited

U.S. PATENT DOCUMENTS

| | | | |
|---|---|---|---|
| 2,676,927 | 4/1954 | McCurdy et al. | 521/907 |
| 3,188,295 | 6/1965 | Ballast et al. | 521/907 |
| 3,271,333 | 9/1966 | Eichhorn | 521/907 |
| 3,590,014 | 6/1971 | Burt | 260/2.5 B |
| 3,631,132 | 12/1971 | Westemacher et al. | 521/907 |
| 3,639,302 | 2/1972 | Brown et al. | 521/907 |

FOREIGN PATENT DOCUMENTS

| | | |
|---|---|---|
| 1170960 | 11/1960 | United Kingdom . |
| 1157116 | 7/1969 | United Kingdom . |
| 1182964 | 3/1970 | United Kingdom . |
| 1290005 | 9/1972 | United Kingdom . |
| 1356401 | 6/1974 | United Kingdom . |

OTHER PUBLICATIONS

French Pat. No. 2,413,420 (Chem. Abs. 92, 7445g; full patent not available.

*Primary Examiner*—Morton Foelak
*Attorney, Agent, or Firm*—Stephen D. Harper

[57] ABSTRACT

Fire-retardant expandable vinyl aromatic polymer beads are prepared by an aqueous suspension method whereby a bromophenyl allyl ether fire-retardant agent and a volatile aliphatic hydrocarbon foaming agents are incorporated into particles of a thermoplastic such as polystyrene. The beads are useful in the preparation of molded foam articles having excellent resistance to flame.

11 Claims, No Drawings

PROCESS FOR THE PREPARATION OF FIRE-RETARDANT EXPANDABLE THERMOPLASTIC BEADS

This is a continuation of application Ser. No. 07/459,400 filed Dec. 26, 1989 now abandoned.

FIELD OF THE INVENTION

This invention pertains to methods for the preparation of fire-retardant expandable vinyl aromatic polymer beads which may be formed into molded foam products.

BACKGROUND OF THE INVENTION:

Foamed thermoplastic polymers enjoy widespread use in building construction due to their low density and excellent heat insulating properties. For such use, it is desirable that the foam be fire-retardant in order to avoid any potential safety hazard. A variety of halogenated organic compounds have been proposed as additives for this purpose. While these compounds can effectively render foams resistant to fire, the presence of a fire-retardant agent can adversely affect the foaming process and the physical properties of the final foamed product. Moreover, certain halogenated organic compounds require the use of synergists such as peroxides to be effective at low concentrations.

U.S. Pat. No. 3,590,014 teaches that polystyrene beads containing a volatile hydrocarbon foaming agent may be coated with a mixture of 2,4,6-tribromophenyl allyl ether and pentabromophenyl allyl ether by tumbling the impregnated beads with the fire-retardant agents and an adhesive. Alternatively, the fire-retardant agent may be applied as a non-adhered powder coating. These methods require a separate impregnation step and do not yield beads having the fire-retardant physically incorporated within the polymer.

Brit. Pat. No. 1,170,960 teaches the preparation of expandable polystyrene beads containing a bromophenyl allyl ether by polymerizing styrene in aqueous suspension in the presence of a volatile foaming agent and the fire-retardant agent. The beads thus obtained are then coated with an additional amount of the bromophenyl allyl ether. The use of an adhesive such as a wax, oil, or ester to bind the fire retardant agent to the bead surface is preferred. The presence of the bromophenyl allyl ether during the free-radical polymerization step may interfere with the polymerization due to termination reactions and may thus adversely affect the molecular weight and physical properties of the final molded foam. In addition, two separate steps (impregnation and coating) are necessary.

French Pat. No. 2,413,420 teaches coating expandable polystyrene particles with a film-forming polymer latex and a fireproofing agent such as pentabromophenyl allyl ether. This method for the preparation of fire-retardant expandable polystyrene beads requires several steps and introduces other substances beside the fire-retardant and foaming agent into the beads.

Brit. Pat. Nos. 1,157,116, 1,356,401 and 1,182,964 teach the preparation of a fire-retardant foamed polymer board wherein a heat-softened polymer resin, a bromophenyl allyl ether, and a volatile foaming agent are intimately mixed in an extruder prior to extrusion. This method is not suitable for the preparation of fire retardant expandable polymer beads.

It is clear that there is a need for simpler methods of preparing expandable thermoplastic beads containing bromophenyl allyl ethers. Such methods should not interfere with the ability to mold the expandable beads into molded foam products or compromise the physical properties of such products.

SUMMARY OF THE INVENTION

This invention provides a method for preparing fire-retardant expandable thermoplastic beads comprising forming an aqueous suspension of 100 parts by weight vinyl aromatic polymer particles, from about 50 to 500 parts by weight water, an effective amount of a suspending agent, from about 0.1 to 1.5 parts by weight of a bromophenyl allyl ether, and from about 3 to 20 parts by weight of a $C_4$-$C_6$ aliphatic hydrocarbon foaming agent. The aqueous suspension is heated at a temperature of from about 40° C. to 140° C. for a period of from about 1 to 15 hours to incorporate the bromophenyl allyl ether and the foaming agent into the polymer particles and to form fire-retardant expandable thermoplastic beads, which are then separated from the water. This process yields expandable thermoplastic beads which can be readily formed into molded foam articles having excellent physical and fire-retardant properties.

DETAILED DESCRIPTION OF THE INVENTION

The vinyl aromatic polymer particles suitable for use in the process of this invention may be spherical or irregularly shaped particles of any of the thermoplastic vinyl aromatic polymers usable in the preparation of molded foam articles. Although homopolymers or copolymers of any vinyl aromatic monomer may be employed, styrene and substituted styrene monomers are preferred. Examples of suitable vinyl aromatic monomers include, but are not limited to, styrene, α-methyl styrene, ar-methyl styrene, arethyl styrene, ar-isopropyl styrene, ar-tert-butyl styrene, vinyl toluene, vinyl xylene, ar-chlorostyrene, vinyl naphthalene, and the like. Minor amounts of other ethylenically unsaturated copolymerizable monomers may also be used, including, for example, butadiene, acrylic acid, methacrylic acid, maleic anhydride, methyl methacrylate, acrylonitrile, and the like. The vinyl aromatic polymer may be rubber modified with an elastomer such as polybutadiene or styrene/butadiene block or random copolymers. The vinyl aromatic polymer particles should preferably be from about 0.1 to 2 mm in average diameter. Methods of obtaining suitable particles such as suspension polymerization or pelletization are well known in the art.

Any bromophenyl allyl ether containing bromine on the aromatic ring may be employed in the process of this invention but it is preferred to use pentabromophenyl allyl ether, 2,4,6-tribromophenyl allyl ether, or mixtures thereof. Most preferably, only 2,4,6-tribromophenyl allyl ether is used. This compound may, however, contain minor amounts of other isomers or other bromophenyl allyl ethers containing differing numbers of bromine substituents. To render the vinyl aromatic polymer particles effectively fire-retardant, from about 0.1 to 1.5 parts by weight of the bromophenyl allyl ether per 100 parts by weight of the particles is preferably present in the aqueous suspension. Most preferably, the level of bromophenyl allyl ether is from about 0.3 to 1.0 parts per weight per 100 parts by weight of the particles.

Suitable $C_4$–$C_6$ aliphatic hydrocarbon foaming agents include n-butane, isobutane, n-pentane, isopentane, n-hexane, 2-methyl pentane, 3-methyl pentane, cyclohexane, cyclopentane, and cyclobutane. Although from about 3 to 20 parts by weight foaming agent per 100 parts by weight vinyl aromatic polymer particles may be used, the preferred amount is from about 5 to 12 parts foaming agent.

These components are suspended in from about 50 to 500 parts (preferably, about 75 to 250 parts) by weight water per 100 parts by weight of the particles using an effective amount of one or more suitable suspending agents. Any of the suspending agents useful in the suspension impregnation of vinyl aromatic polymer particles may be used. Examples of suitable suspending agents include finely divided water-insoluble inorganic substances such as tricalcium phosphate, zinc oxide, bentonite, talc, kaolin, magnesium carbonate, aluminum oxide and the like as well as water-soluble polymers such as polyvinyl alcohol, alkyl aryl sulfonates, hydroxyethyl cellulose, polyacrylic acid, methyl cellulose, polyvinyl pyrrolidone, and the like. Auxiliary suspending agents such as sodium linear alkylbenzene sulfonates may also be employed. The use of tricalcium phosphate together with a sodium linear alkylbenzene sulfonate is particularly preferred. The amount of the suspending agent necessary will vary depending on a number of factors but will generally be from about 0.01 to 1 part by weight per 100 parts by weight of the vinyl aromatic polymer particles. One or more surfactants such as a polyoxyalkylene derivative of sorbitan monolaurate or other fatty acid ester, an ethylene oxide/propylene oxide block copolymer, or other non-ionic or anionic surface active agent can be added to the aqueous suspension if desired. The preferred amount of surfactant is from about 0.01 to 1 part by weight per 100 parts by weight vinyl aromatic polymer particles.

The aqueous suspension is then heated, preferably while stirring or mixing, at a temperature of from about 40° C. to 140° C. (preferably, from about 50° C. to 130° C.) for a period of from about 1 to 15 hours (preferably, from about 2 to 10 hours) until the bromophenyl allyl ether and the aliphatic hydrocarbon foaming agent are incorporated into the vinyl aromatic polymer particles. The temperature may advantageously be varied during this impregnation step.

Following impregnation, the fire-retardant expandable vinyl aromatic polymer beads are separated from the water using an appropriate method such as filtration, centrifugation, or decantation. The beads may be washed with additional water and then dried, if desired. If a suspending agent such as tricalcium phosphate is used, it may be desirable to first wash the beads with dilute acid (hydrochloric acid, for example) to remove the suspending agent.

The fire-retardant expandable vinyl aromatic polymer beads produced by the process of this invention may be readily shaped into molded foam articles by heating. The beads expand and fuse together to form the molded article. Prior to the final molding step, the beads preferably are pre-expanded. Such methods of preparing molded-bead foams are well-known and are described, for example, in Ingram et.al. "Polystyrene and Related Thermoplastic Foams" *Plastic Foams*, Marcel Dekker (1973), Part II, Chapter 10, pp. 531–581, Ingram "Expandable Polystyrene Processes" *Addition and Condensation Polymerization Process* American Chemical Society (1969), Chapter 33, pp. 531–535. The teachings of these references are incorporated herein in their entirety.

Molded foam articles prepared using the fire-retardant expandable vinyl aromatic beads of this invention are highly resistant to flame, even when relatively low levels of the bromophenyl allyl ether are present. The use of peroxy synergists is not necessary in order to achieve satisfactory fire retardancy. The bromophenyl allyl ether is incorporated uniformly within the beads rather than coated on the surface of the beads as in prior art methods and thus does not interfere with the fusion of the beads when they are expanded into molded foam articles. The density, tensile strength, heat resistance and other physical and mechanical properties of the foams are unaffected by the presence of the bromophenyl allyl ether if the process of this invention is employed.

Without further elaboration, it is believed that one skilled in the art can, using the proceeding description, utilize the present invention to its fullest extent. The following examples, therefore, are to be considered as merely illustrative and not limitative of the claims or remainder of the disclosure in any way whatsoever.

EXAMPLES-GENERAL PROCEDURES

FOAMING METHOD

Fire-retardant expandable polystyrene beads were prepared as described below, pre-expanded, and then molded by vacuum charging to a $2'' \times 8''$ diameter pre-heated mold cavity. The beads were fused at about 115° C. for 5–10 seconds in the mold; the resulting foam disc was then cooled by circulating water in the mold.

VERTICAL TEST METHOD

A number of $6 \times 1 \times \frac{1}{2}$ inch specimens are cut from each foam disc and conditioned at 60° C. under vacuum for 16 hours. Each specimen is hung lengthwise from a clamp and a microburner having a $\frac{3}{4}$ inch yellow flame is used to contact the bottom edge of the foam sample for 3 seconds. The average vertical burn time (time from the withdrawal of the flame to flameout of the foam) for 5 samples is determined.

HORIZONTAL TEST METHOD

A number of $6 \times 2 \times \frac{1}{2}$ inch specimens are cut from each foam disc and conditioned at 60° C. under vacuum for 16 hours. The test apparatus consists of a 4 mesh steel hardware cloth held by clamps and a ring stand so that the $3'' \times 8''$ section is horizontal and $\frac{1}{2}$ above a Bunsen burner equipped with a wing tip top. The test specimen is placed flat on the hardware cloth, with the $6'' \times 2''$ surface of the specimen horizontal. One end of the specimen is in contact with the upturned end of the hardware cloth.

The Bunsen burner with the wing tip top is adjusted to provide a blue flame whose visible portion is $1\frac{1}{2}''$ high. The burner is then placed under the upturned end of the specimen support so that a long edge of the flame is applied to the front end of the specimen. The flame is applied for one minute and then removed from the specimen.

The duration of burning of the specimen, if any, after removal of the test flame is noted. The extent of burning of the specimen during and after application of the test flame is measured from the end exposed to the flame.

EXAMPLES 1-4

These examples illustrate the preparation of fire-retardant expandable polystyrene beads at various temperatures in accordance with the process of this invention.

Sealable soda pop bottles were charged with 100 mL distilled water, 2.0 g tricalcium phosphate (suspending agent), 0.1 g Tween ® (a polyoxyalkylene derivative of sorbitan monolaurate, sold by ICI America), 2.0 mL 1% Nacconole ® (sodium linear alkyl benzene sulfonate, sold by Stepan Chemical Co.), 0.833 g 2,4,6-tribromophenyl allyl ether (obtained from Ameribrom, a division of Dead Sea Bromine Co.) 100 g of polystyrene beads (ave. diameter ca. 1 mm; 220,000 molecular weight), and 8.1 g n-pentane. The bottles were shaken, sealed, and placed in a bottle tumbler. The bottles were heated from 55° C. to the temperature shown in Table I over a 1.75 hr. period, maintained at that temperature for 1.5 hr., then cooled to 85° C. for 1 hr., cooled to 60° C. for 1 hr., and finally cooled to 45° C. for 1 hr. The impregnated beads were collected by filtration, washed with 1N HCl, and tray dried.

Substantially all of the 2,4,6-tribromophenyl allyl ether incorporated into the polystyrene beads in each case, although lower impregnation temperatures appeared to favor more complete inclusion of the fire-retardant agent. In each case, however, the flame resistance of the molded foam specimen (as measured by vertical burn and horizontal burn) was excellent (Table I).

EXAMPLES 5-11

Expandable polystyrene beads containing varying levels of 2,4,6-tribromophenyl allyl ether were prepared using the procedure described for examples 1-4. The impregnations were carried out at 120° C. for 2 hours. Molded foam specimens were prepared and tested in the same manner as described above. The results of the vertical and horizontal burn tests are shown in FIGS. 1 and 2.

EXAMPLE 12

The preparation of expandable fire-retardant polystyrene beads by the process of this invention on a large scale is demonstrated by this example A 100 gallon reactor was charged with 177 Kg water, 177 Kg polystyrene beads (ave. diameter ca. 1 mm; 220,000 molecular weight), and 1.19 Kg tricalcium phosphate. A premix of 9.0 Kg water, 1.47 Kg (0.833 wt. % based on wt. of polystyrene beads) 2,4,6-tribromophenyl allyl ether, 0.19 Kg Tween ® 20, 0.32 Kg tricalcium phosphate and 0.036 Kg Nacconole was then added. After heating the aqueous suspension to 55° C., 14.5 Kg n-pentane was added over a 3 hour period. During the addition of the blowing agent, the temperature was increased from 55° C. to 110° C. over a 1.33 hr. period. The suspension was then heated from 110° C. to 120° C. over 0.58 hr. held at 120° C. for 1.5 hr., and then cooled to 85° C. over 1 hr., cooled to 60° C. over 1 hr., and finally cooled to 45° over 1 hr.

The impregnated beads were collected and treated in the same manner a described in Examples 1-4 and then molded into foam discs and tested for flame resistance as described previously. The results of the vertical and horizontal burn tests at two different foam densities are shown in Table II.

TABLE I

| Example No. | Max Temp. (°C.) | Wt. % Br. Found | % Theor. Br. Incorp. | Vertical Burn (sec.) | Horizontal Burn (in.) |
| --- | --- | --- | --- | --- | --- |
| 1 | 115 | 0.46 | 85 | 1.1 | 1.13 |
| 2 | 110 | 0.47 | 87 | 1.0 | 1.24 |
| 3 | 105 | 0.52 | 96 | 1.9 | 1.11 |
| 4 | 100 | 0.52 | 96 | 1.5 | 1.18 |

We claim:

1. A process for preparing fire-retardant expandable thermoplastic beads comprising:
   (a) forming an aqueous suspension of 100 parts by weight vinyl aromatic polymer particles, from about 50 to 500 parts by weight water, an effective amount of a suspending agent, from about 0.1 to 1.5 parts by weight of a bromophenyl allyl ether, and from about 3 to 20 parts by weight of a $C_4$-$C_6$ aliphatic hydrocarbon foaming agent;
   (b) heating the aqueous suspension at a temperature of from about 40° C. to 140° C. for a period of from about 1 to 15 hours to uniformly incorporate the bromophenyl allyl ether and the foaming agent into the polymer particles to form fire-retardant expandable thermoplastic beads;
   (c) separating the beads from the water.

2. The process of claim 1 wherein the vinyl aromatic polymer particles are polystyrene particles.

3. The process of claim 1 wherein the suspending agent is tricalcium phosphate.

4. The process of claim 1 wherein the bromophenyl allyl ether is 2,4,6-tribromophenyl allyl ether.

5. The process of claim 1 wherein the $C_4$-$C_6$ aliphatic hydrocarbon foaming agent is n-pentane.

6. The process of claim 1 comprising the additional steps after step (c) of washing and drying the separated beads.

7. The process of claim 1 wherein the average diameter the vinyl aromatic polymer particles is from about 0.1 to 2.0 mm.

8. The process of claim 1 wherein the aqueous suspension additionally contains from 0.01 to 1 part by weight of a surfactant.

9. A process for preparing fire-retardant expandable polystyrene beads comprising:
   (a) forming an aqueous suspension of 100 parts by weight polystyrene particles having an average diameter of from about 0.1 to 2.0 mm, from about 75 to 250 parts be weight water, from about 0.01 to 1 part by weight tricalcium phosphate suspending agent, from about 0.01 to 1 part by weight of a non-ionic surfactant, from about 0.3 to 1.0 part by weight of 2,4,6-tribromophenyl allyl ether, and from about 5 to 12 parts be weight n-pentane forming agent;
   (b) heating the aqueous suspension at a temperature of from about 50° C. to 130° C. for a period of from about 2 to 10 hours to uniformly incorporate the 2,4,6-tribromophenyl allyl ether and n-pentane into the polystyrene particles to form fire-retardant expandable polystyrene beads;
(c) separating the beads from the water;
(d) washing the separated beads; and
(e) drying the washed beads.

10. The process of claim 9 wherein the separated beads are washed first with dilute hydrochloric acid and then with water in step (d).

11. The process of claim 9 wherein the non-ionic surfactant is a polyoxyalkylene sorbitan fatty acid ester.

* * * * *